United States Patent
Klimke et al.

(10) Patent No.: US 8,895,685 B2
(45) Date of Patent: Nov. 25, 2014

(54) POLYPROPYLENE COMPOSITION SUITABLE FOR EXTRUSION COATING

(75) Inventors: Katja Klimke, Linz (AT); Juha Yli-Peltola, Tampere (FI); Elke Pachner, Wels (AT); Doris Machl, Mettmach (AT); Hermann Braun, Linz (AT); Susana Filipe, Leonding (AT); Anh Tuan Tran, Langenstein (AT)

(73) Assignee: Borealis AG, Porvoo (FI)

( * ) Notice: Subject to any disclaimer, the term of this patent is extended or adjusted under 35 U.S.C. 154(b) by 0 days.

(21) Appl. No.: 13/696,868

(22) PCT Filed: Jan. 21, 2011

(86) PCT No.: PCT/EP2011/000255
§ 371 (c)(1),
(2), (4) Date: Jan. 29, 2013

(87) PCT Pub. No.: WO2011/141070
PCT Pub. Date: Nov. 17, 2011

(65) Prior Publication Data
US 2013/0123416 A1 May 16, 2013

(30) Foreign Application Priority Data
May 11, 2010 (EP) .................................... 10004990

(51) Int. Cl.
| | | |
|---|---|---|
| C08F 210/06 | (2006.01) | |
| C08F 110/06 | (2006.01) | |
| C08F 255/02 | (2006.01) | |

(52) U.S. Cl.
USPC ............ 526/351; 526/339; 526/263; 526/387

(58) Field of Classification Search
USPC .............. 525/240, 333.8, 388, 263, 267, 387; 526/351, 142, 339, 263, 387
IPC ....................................................... C08F 255/02
See application file for complete search history.

(56) References Cited

U.S. PATENT DOCUMENTS

| | | | | |
|---|---|---|---|---|
| 4,602,077 | A * | 7/1986 | Cecchin et al. | 526/339 |
| 5,504,171 | A * | 4/1996 | Etherton et al. | 526/336 |
| 6,077,907 | A * | 6/2000 | Raetzsch et al. | 525/191 |
| 6,162,843 | A * | 12/2000 | Fisher et al. | 522/125 |
| 6,204,348 | B1 * | 3/2001 | Raetzsch et al. | 526/351 |
| 6,797,778 | B2 * | 9/2004 | Reichelt et al. | 525/191 |
| 8,722,805 | B2 * | 5/2014 | Filipe et al. | 525/191 |
| 2013/0123416 | A1 * | 5/2013 | Klimke et al. | 524/534 |
| 2013/0123431 | A1 * | 5/2013 | Filipe et al. | 525/240 |

FOREIGN PATENT DOCUMENTS

| | | | |
|---|---|---|---|
| EP | 1 741 725 | 1/2007 | |
| EP | 1 847 555 | 10/2007 | |
| EP | 1 892 264 | 2/2008 | |
| EP | 1 903 070 | 3/2008 | |
| EP | 2 133 389 | 12/2009 | |
| JP | 2-269110 | * 11/1990 | ............ C08F 255/02 |
| JP | 4-110314 | * 4/1992 | ............ C08F 255/00 |
| JP | 8-127697 | * 5/1996 | ............ C08L 51/06 |
| KR | 10-0681871 | 2/2007 | |
| WO | WO 01/48034 | 7/2001 | |
| WO | WO 03/051934 | 6/2003 | |
| WO | WO 2009/133016 | 11/2009 | |

OTHER PUBLICATIONS

International Search Report mailed Mar. 17, 2011 for International application No. PCT/EP2011/000255.

* cited by examiner

*Primary Examiner* — Rip A. Lee
(74) *Attorney, Agent, or Firm* — Fay Sharpe LLP

(57) ABSTRACT

Polypropylene composition comprising a polypropylene base resin whereby the polypropylene base resin has a MFR (2.16 kg, 230° C., ISO 1133) of 8 to 24 g/10 min and a LAOS-NLF>2.8 whereby LAOS–NLF=$|G'_1/G'_3|$ where $G'_1$—first order Fourier Coefficient, $G'_3$—third order Fourier Coefficient.

13 Claims, No Drawings

POLYPROPYLENE COMPOSITION SUITABLE FOR EXTRUSION COATING

The present invention relates to a polypropylene composition suitable for extrusion coating, a process for the provision of such polypropylene compositions and extrusion coated articles and a process for producing the same.

In general, extrusion coating of substrates such as paper, paperboard, fabrics and metal foils with a thin layer of plastic is practiced on a large scale. The coating composition is extruded in a first step whereby the flux of molten polymeric material passes through a flat die to obtain a film having a thickness of a few microns. In the second step, ie. the coating step, the film is laid on a support and passed on a cooling cylinder. Upon cooling, the polymer adheres to its support.

Low density polyethylene (LDPE) is often used in extrusion coating because of the ease in processing although stiffness, barrier properties and temperature resistance of LDPE are not satisfactory. Polypropylene is attractive due to advantages as to heat tolerance and transparency. However polypropylene suffers from bad processability such as high neck-in and low maximum coating speed. The limited processing properties of polypropylene partially can be minimized by high melt strength polypropylene being characterized by branchings in the linear polymer backbone. This can be achieved either through post-reactor treatment, through copolymerization with dienes, or through polymerization with specific catalysts.

High speed extrusion coating asks for relative high melt flow rates $MFR_2$ of 15 g/10 min or higher. Such melt flow rates usually can only be obtained by visbreaking, i.e. treatment with peroxide in the absence of dienes. However, the main reaction, i.e. branching reaction, caused by peroxide treatment leading to higher degree of branching unfortunately is always accompanied by beta scission as a side reaction, i.e. significant degradation of the polypropylene. Such degradation is responsible for the formation of gels which limits the use of polypropylene compositions in high demand applications such as in the medical area.

WO 2009/133016 discloses a two component adhesion compositions suitable for extrusion coating comprising a blend of high melt strength polypropylene and one component selected from the group of (i) maleic anhydride-modified polypropylene (MAPP) (ii) maleic anhydride-modified polypropylene wax (iii) polypropylene homopolymer with high melt flow rate or (iv) ethylene-vinyl acetate-based hot melt adhesive. This composition allows extrusion coating only at limited line speeds.

KR 681871B1 is directed to blends of polypropylene copolymers and low density polyethylene for extrusion coating. However, the desired melt flow rate characteristics are obtained by the addition of low density polyethylene leading to limited thermal stability.

WO 2008/100720 discloses a blend of polypropylene and low density polyethylene for extrusion coating.

EP 1847555 discloses a polypropylene having a low branching index g' which shows pronounced strain hardening at high strain rates, i.e. the faster the material is stretched, the higher the strain hardening index (SHI) and hence the more stable the material. The material originates from in-reactor long chain branching.

Polypropylene having strain hardening behaviour is for example described in EP 1 903 070 reporting polypropylene having a high melt strength due to a large number of side chains (branched polypropylene) leading also to relatively high stiffness. The use of the specific polypropylene is only described for the matrix as far as heterophasic polypropylenes are concerned.

EP 1 847 555 relates to multi-branched polypropylene homo- and copolymers. The material shows extensional melt flow properties leading to high stability in extrusion processes. The use of the specific polypropylene is only described for the matrix in a heterophasic polypropylene.

Polypropylenes comprising a base resin consisting of two different polypropylene homo- or copolymers and a linear low density ethylene homo- or copolymer are disclosed in EP 2 133 389, having good heat resistance and can be processed with increased throughput.

EP 1 892 264 is directed to articles comprising a substrate which is extrusion coated with compositions based on polypropylene being multi-branched.

There is still the need for alternative or improved propylene polymer compositions being suitable for extrusion coating for a broad variety of substrates having excellent processability, low gel content, and being capable of withstanding high temperatures. There is particularly the need for propylene polymer compositions being suitable for extrusion coating without the need for the addition of processing aids such as LDPE or the use of heterophasic materials.

The present invention is based on the finding that the above object can be achieved by a polypropylene having long chain branching of homogeneous nature and high degree being reflected by a high viscoelastic LAOS non-linearity factor LAOS-NLF, defined as $$LAOS-NLF = \left| \frac{G'_1}{G'_3} \right|$$

where $G'_1$—first order Fourier Coefficient
$G'_3$—third order Fourier Coefficient The present invention insofar provides a polypropylene composition comprising a polypropylene base resin whereby the polypropylene base resin has a MFR (2.16 kg, 230° C., ISO 1133) of 8.0 to 24 g/10 min and a LAOS-NLF>2.8 defined as $$LAOS-NLF = \left| \frac{G'_1}{G'_3} \right|$$

where $G'_1$—first order Fourier Coefficient
$G'_3$—third order Fourier Coefficient The term "polypropylene composition" used herein denotes compositions consisting of 96 wt.-% polypropylene base resin and stabilizers in an amount of up to 4 wt.-% with respect to the total polypropylene composition.

The term "polypropylene base resin" as used herein further denotes both polypropylene homopolymers and random polypropylene copolymers. A "polypropylene base resin" is a monophasic resin.

A monophasic resin denotes a resin having only one Tg when being subjected to DSC.

Catalyst denotes the organo-metalic compound containing the reaction centre of the polymerisation.

Catalyst system denotes the mixture of the catalyst, the optional cocatalyst and the optional support.

Visbreaking denotes subjecting a polymer resin to peroxide treatments in the absence of a bifunctionally unsaturated molecule such as a diene.

"an asymmetric catalyst derived polypropylene" denotes a polypropylene having been produced in the presence of an asymmetric catalyst catalyst.

The polypropylene base resin according to the present invention is either a polypropylene homopolymer or a random polypropylene copolymer.

It is preferred that the polypropylene base resin is a homopolymer.

When the polypropylene base resin is a random polypropylene copolymer the comonomer content preferably is below 15 mole-% more preferably below 10 mole-% and most preferably below 4 mole-%. The comonomer(s) preferably is/are selected from the group of ethylene and alpha olefins, more preferably ethylene and $C_4$ to $C_{12}$ alpha olefins, most preferably ethylene or butene.

The polypropylene composition according to the present invention preferably comprises the polypropylene base resin having a MFR (2.16 kg, 230° C., ISO 1133) of 8.0 to 24 g/10 min and a LAOS-NLF>2.5 defined as $$LAOS - NLF = \left|\frac{G'_1}{G'_3}\right|$$

where $G'_1$—first order Fourier Coefficient
$G'_3$—third order Fourier Coefficient
in an amount of 96 wt.-%, more preferably 97 wt.-% and most preferably 98 wt.-% with respect to the total polypropylene composition.

The polypropylene composition according to the present invention preferably consists of the polypropylene base resin having a MFR (2.16 kg, 230° C., ISO 1133) of 8.0 to 24 g/10 min and a LAOS-NLF>2.8 defined as $$LAOS - NLF = \left|\frac{G'_1}{G'_3}\right|$$

where $G'_1$—first order Fourier Coefficient
$G'_3$—third order Fourier Coefficient
and modifiers and/or additives in an amount of up to 4 wt.-%, more preferably up to 3 wt.-% and most preferably up to 2 wt.-% with respect to the total of the polypropylene composition.

More preferably, the modifiers are selected from poly-1-butene, poly-4-methylpentene-1 as well as mineral fillers like talc or calcium carbonate. Suitable additives include stabilizers, lubricants, nucleating agents, pigments and foaming agents. These modifiers and/or additives may be included during the polymerisation process or after the polymerisation by melt mixing. It is however preferred that the modifiers do not lower the melting temperature of the composition. It is particularly preferred that the polypropylene composition according to the present invention does not contain LDPE, recognizable by the absence of any melting points below 135° C. in DSC.

A very sensitive and at the same time simple characterization method being commonly used in the scientific literature is large amplitude oscillatory shear (LAOS). In this method a single excitation frequency is applied and the torque response is analysed. The non-linear response generates mechanical higher harmonics at (3, 5, 7, ... ). Fourier Transform analysis allows recovery of intensities and phases. As the intensity of the higher harmonics decreases rapidly, which can lead to very low values of the $5^{th}$ and higher harmonics, the ratio of the $$LAOS - NLF = \left|\frac{G'_1}{G'_3}\right|$$

where $G'_1$—first order Fourier Coefficient
$G'_3$—third order Fourier Coefficient
provides the most reliable characterization of the polymer structure.

Another option of characterizing the polymer structure being mainly responsible for the benefits of the present invention, particularly the nature of long chain branching is the strain hardening factor being defined as $$SHF = \frac{\eta_E^+(t, \dot{\varepsilon})}{\eta_{LVE}^+(t)} = \frac{\eta_E^+(t, \dot{\varepsilon})}{3\eta^+(t)}$$

wherein
$\eta_E^+(t,\dot{\varepsilon})$ is the uniaxial extensional viscosity; and
$\eta_{LVE}^+(t)$ is three times the time dependent shear viscosity $\eta^+(t)$ in the linear range of deformation. The determination of the linear viscoelastic envelop in extension $\eta_{LVE}^+(t)$, is based on IRIS Rheo Hub 2008 requiring the calculation of the discrete relaxation time spectrum from the storage and loss modulus data (G', G" ($\omega$)). Details about the method can be found in the experimental part. The strain hardening factor mainly reflects the degree of "dispersion" (heterogeneity) of the branches relative to the polymer backbone. Secondarily the strain hardening factor also provides information about the branching degree.

Yet another method of characterizing the structure of branched polypropylene is the Rheotens measurement. Branched polypropylene shows higher melt strength with increasing shear applied on the polymer such as during melt extrusion. This property is well-known as strain hardening. In the Rheotens test, the strain hardening behaviour of polymers is analysed by Rheotens apparatus (product of Göttfert, Siemensstr. 2, 74711 Buchen, Germany) in which a melt strand is elongated by drawing down with a defined acceleration. The haul-off force F in dependence of draw-down velocity v is recorded. The test procedure is performed at a temperature of 23° C. Further details are given in the experimental part.

The polypropylene composition according to the present invention preferably includes a polypropylene base resin having a LAOS-NLF defined as $$LAOS - NLF = \left|\frac{G'_1}{G'_3}\right|$$

where $G'_1$—first order Fourier Coefficient
$G'_3$—third order Fourier Coefficient
of more than 2.8, more preferably of more than 3.0 and most preferably of more than 3.5.

LAOS-NLF of higher than 2.8 indicate a high degree of long chain branching.

The polypropylene composition according to the present invention preferably includes a polypropylene base resin having a strain hardening factor (SHF) of 2.3 to 7.0, preferably 2.5 to 6.5, more preferably 2.8 to 6.5 and most preferably 3.3 to 5.0 when measured at a strain rate of 3.0 $s^{-1}$ and a Hencky strain of 2.5.

Moreover, the polypropylene composition according to the present invention preferably includes a polypropylene base resin having a strain hardening factor (SHF) of 1.7 to 6.0, more preferably of 1.75 to 5.5, and most preferably 1.80 to 5.0 when measured at a strain rate of $1.0\,s^{-1}$ and a Hencky strain of 2.0.

It should be understood that the preferred strain hardening factors (SHF) as mentioned above can be present individually but also can be present in combination.

The polypropylene composition according to the present invention further preferably includes a polypropylene base resin having a F30 melt strength of 4.6 cN or higher, more preferably 6.0 cN or higher and most preferably 9.0 cN or higher at 200° C. when being subjected to the Rheotens melt strength test as described in the experimental part. Usually the F30 melt strength will not be higher than 20 cN.

The polypropylene composition according to the present invention preferably has a melting temperature Tm in the range of 135 to 165° C., more preferably from 140 to 162° C. and most preferably from 150 to 161° C. High melting temperatures enable the provision of materials capable of withstanding steam sterilization. Higher melting temperatures can be achieved with polypropylene homopolymers and higher crystallinity.

The polypropylene composition according to the present invention preferably includes a polypropylene base resin showing a 2-1 regioinversion of above 0.1 mol-% when measured by means of $^{13}C$-NMR according to the methodology described by J. C. Randall in "Polymer sequence determination $^{13}C$ NMR method", Academic Press 1977. The content of regioinversions is calculated on the basis of the relative concentrations of S(alpha,beta)+S(beta,beta) methylene sequences. Further details are given in the experimental part. The regioinversion mainly can be influenced by catalyst modification.

The polypropylene composition according to the present invention preferably includes a polypropylene base resin being characterized by a high F30 melt strength in the rheotens test as described above and at the same time high melt flow rate $MFR_2$. The polypropylene base resin insofar is preferably characterized by a product of F30 melt strength x $MFR_2$ (2.16 kg, 230° C., ISO 1133) of 130 cNg/10 min or higher, more preferably 140 cNg/10 min or higher and most preferably 145 cNg/10 min or higher. For practical reasons the product of F30 melt strength and $MFR_2$ usually will be limited to about 200 cNg/10 min.

The present invention is further concerned with a process for the production of the polypropylene composition according to the present invention.

The process according to the present invention involves producing a polypropylene intermediate base resin having a MFR (2.16 kg, 230° C.) of 1.0 to 6.0 g/10 min determined according to ISO 1133 in the presence of an asymmetric catalyst. The polypropylene intermediate base resin is then mixed with peroxide and a diene at a temperature of 20 to 90° C. for at least 2 minutes to form a pre-mixed material. The pre-mixed material is then subjected to melt mixing in a melt mixing device at a barell temperature in the range of 180 to 300° C.

It is essential that the whole process does not involve visbreaking, i.e. subjecting any intermediate product to peroxide treatment in the absence of a diene such as butadiene.

Suitable dienes are conjugated or non-conjugated dienes linear or branched dienes containing 4 to 20 carbon atoms. Preferred dienes include isoprene, 2,3-dimethylbutadiene, 1,3-pentadiene, 1,3-hexadiene, 1,4 octadiene and butadiene. The most preferred diene is butadiene.

The polypropylene intermediate base resin is pre-mixed with the diene and peroxide in a powder mixing device, like a horizontal mixer with paddle stirrer. The pre-mixing preferably is carried out at a temperature of the polymer powder of 25 to 80° C., most preferably in the range of 30 to 75° C. The residence time of the polymer in the pre-mixing step is preferably 5 to 30 minutes, more preferably 8 to 20 minutes.

The pre-mixed material is then melt-mixed at a barell temperature of 180 to 300° C., preferably in a continuous melt mixing device like a single screw extruder, a co-rotating twin screw extruder or a co-kneader.

The barell temperature preferably is in the range of 200 to 280° C. More preferably a specific temperature profile is maintained along the screw of the melt-mixing device, having an initial temperature T1 in the feed zone, a maximum temperature T2 in the kneading zone and a final temperature T3 in the die zone, all temperatures being defined as barrel temperatures and fulfilling the following relation: T1<T3<T2. Barell temperature T1 is preferably in the range of 180 to 210° C. Barell temperature T2 (in the kneading zone) preferably is in the range of 280 to 300° C. Barell temperature T3 (in the die zone) preferably is in the range of 260 to 290° C.

The screw speed of the melt mixing device preferably is adjusted to a range from 150 to 800 rotations per minute (rpm).

Following the melt-mixing step, the resulting polymer melt is pelletized either in an underwater pelletizer or after solidification of one or more strands in a waterbath in a strand pelletizer.

The present invention is further concerned with a polypropylene composition comprising a polypropylene base resin having a MFR (2.16 kg, 230° C.) of 8.0 to 24 g/10 min obtainable by
producing a polypropylene intermediate base resin having a MFR (2.16 kg, 230° C.) of 1.0 to 6.0 g/10 min determined according to ISO 1133 in the presence of an asymmetric catalyst;
mixing the polypropylene intermediate base resin with peroxide and a diene at a temperature of 20 to 90° C. for at least 2 minutes to form a pre-mixed material;
melt mixing the pre-mixed material in a melt mixing device at a barell temperature in the range of 180 to 300° C.

The melt mixing device preferably includes a feed zone, a kneading zone and a die zone, whereby an initial barell temperature T1 is maintained in the feed zone, a barell temperature T2 is maintained in the kneading zone and a die barell temperature T3 is maintained in the die zone. Preferably the barell temperatures T1, T2, and T3 satisfy the following relation: T1<T3<T2.

Suitable dienes are conjugated or non-conjugated dienes linear or branched dienes containing 4 to 20 carbon atoms. Preferred dienes include isoprene, 2,3-dimethylbutadiene, 1,3-pentadiene, 1,3-hexadiene, 1,4 octadiene and butadiene. The most preferred diene is butadiene.

The polypropylene composition according to the present invention is preferably obtainable by pre-mixing in the presence of 0.3 to 1.0 wt-% peroxide, more preferably in the presence of 0.4 to 0.7 wt.-% peroxide. Even more preferably the polypropylene composition according to the present invention is obtainable by pre-mixing in the presence of 0.3 to 1.0 wt-%, most preferably 0.4 to 0.7 wt.-% tert-butylperoxy isopropyl carbonate (CAS No. 2372-21-6) being commercially available as Trigonox® BPIC-C75 (Akzo Nobel, NL)—75% solution in mineral spirits.

Even more preferably, the polypropylene composition is obtainable by pre-mixing in the presence of a diene in a concentration of 0.3 to 2.0 wt %, most preferably the polypropylene composition is obtainable by pre-mixing in the presence of butadiene in a concentration of 0.3 to 2.0 wt %.

It should be understood that the addition of the diene and the peroxide may be achieved at once in the pre-mixing stage or may be split up in two additions, a first addition in the pre-mixing stage and a second addition in the melt-mixing stage. Complete addition of the diene and the peroxide in the pre-mixing stage is preferred.

The intermediate base resin preferably has a 2-1 regio-inversion of above 0.1 mol-%, more preferably above 0.2 mol-% and most preferably above 0.3 mol-% when measured by means of $^{13}$C-NMR according to the methodology described by J. C. Randall in "Polymer sequence determination $^{13}$C NMR method", Academic Press 1977. The content of regioinversions is calculated on the basis of the relative concentrations of S(alpha,beta)+S(beta,beta) methylene sequences. Further details are given in the experimental part. The regioinversion mainly can be influenced by catalyst modification.

The polypropylene intermediate base resin having a MFR (2.16 kg, 230° C.) of 1.0 to 6.0 g/10 min determined according to ISO 1133 is preferably obtainable by a catalyst system comprising an asymmetric metallocene catalyst. According to one specific embodiment the catalyst system has a porosity of less than 1.40 ml/g, more preferably less than 1.30 ml/g and most preferably less than 1.00 ml/g. The porosity has been measured according to DIN 66135 ($N_2$). In another preferred embodiment the porosity is below detection limit when determined with the method applied according to DIN 66135.

The catalyst system may further comprise an activator as a cocatalyst, as described in WO 03/051934, which is enclosed herein by reference.

An asymmetric metallocene catalyst according to this invention is a catalyst comprising at least two organic ligands which differ in their chemical structure.

Furthermore it is preferred, that the catalyst system has a surface area of less than 25 m$^2$/g, yet more preferred less than 20 m$^2$/g, still more preferred less than 15 m$^2$/g, yet still less than 10 m$^2$/g and most preferred less than 5 m$^2$/g. The surface area according to this invention is measured according to ISO 9277 ($N_2$).

It is in particular preferred that the catalytic system according to this invention comprises an asymmetric catalyst, i.e. a catalyst as defined below. In a specific embodiment the porosity of the catalyst system is not detectable when applying the method according to DIN 66135 ($N_2$) and has a surface area measured according to ISO 9277 ($N_2$) less than 5 m$^2$/g.

Preferably, the asymmetric catalyst employed comprises an organo-metallic compound of a transition metal of group 3 to 10 or the periodic table (IUPAC) or of an actinide or lanthanide.

The asymmetric catalyst is more preferably of a transition metal compound of formula (I)

  (I)

wherein

M is a transition metal of group 3 to 10 or the periodic table (IUPAC), or of an actinide or lantanide,
each X is independently a monovalent anionic ligand, such as σ-ligand,
each L is independently an organic ligand which coordinates to M,
R is a bridging group linking two ligands L,
m is 2 or 3,
n is 0 or 1,
q is 1, 2 or 3,
m+q is equal to the valency of the metal, and
with the proviso that at least two ligands "L" are of different chemical structure.

Said asymmetric catalyst is preferably a single site catalyst (SSC).

In a more preferred definition, each "L" is independently
(a) a substituted or unsubstituted cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC); or
(b) an acyclic, $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or
(c) a cyclic σ, $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems and containing carbon ring atoms and optionally one or more heteroatoms selected from Groups 15 and 16 of the Periodic Table.

The term "σ-ligand" is understood in the whole description in a known manner, i.e. a group bonded to the metal at one or more places via a sigma bond. A preferred monovalent anionic ligand is halogen, in particular chlorine (Cl).

In a preferred embodiment, the asymmetric catalyst is preferably of a transition metal compound of formula (I)

  (I)

wherein

M is a transition metal of group 3 to 10 or the periodic table (IUPAC), or of an actinide or lantanide,
each X is independently a monovalent anionic ligand, such as σ-ligand,
each L is independently an organic ligand which coordinates to M, wherein the organic ligand is an unsaturated organic cyclic ligand, more preferably a substituted or unsubstituted, cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC),
R is a bridging group linking two ligands L,
m is 2 or 3,
n is 0 or 1,
q is 1, 2 or 3,
m+q is equal to the valency of the metal, and
with the proviso that at least two ligands "L" are of different chemical structure.

According to a preferred embodiment said asymmetric catalyst compound (I) is a group of compounds known as metallocenes. Said metallocenes bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, more preferably zirconium, which contains at least one $\eta^5$-ligand.

Preferably the asymmetric catalyst compound has a formula (II):

  (II)

wherein
M is Zr, Hf or Ti, preferably Zr
each X is independently a monovalent anionic ligand, such as σ-ligand,
each Cp is independently an unsaturated organic cyclic ligand which coordinates to M,
R is a bridging group linking two ligands L,
m is 2,
n is 0 or 1, more preferably 1, q is 1, 2 or 3, more preferably 2, m+q is equal to the valency of the metal, and at least one Cp-ligand, preferably both Cp-ligands, is(are) selected from the group consisting of unsubstituted cyclopenadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, with the proviso in case both Cp-ligands are selected from the above stated group that both Cp-ligands must chemically differ from each other.

Preferably, the asymmetric catalyst is of formula (II) indicated above, wherein

M is Zr each X is Cl, n is 1, and q is 2.

Preferably both Cp-ligands have different residues to obtain an asymmetric structure.

Preferably, both Cp-ligands are selected from the group consisting of substituted cyclopentadienyl-ring, substituted indenyl-ring, substituted tetrahydroindenyl-ring, and substituted fluorenyl-ring wherein the Cp-ligands differ in the substituents bonded to the rings.

The optional one or more substituent(s) bonded to cyclopentadienyl, indenyl, tetrahydroindenyl, or fluorenyl may be independently selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ and —NR"$_2$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands are indenyl moieties wherein each indenyl moiety bear one or two substituents as defined above. More preferably each Cp-ligand is an indenyl moiety bearing two substituents as defined above, with the proviso that the substituents are chosen in such are manner that both Cp-ligands are of different chemical structure, i.e both Cp-ligands differ at least in one substituent bonded to the indenyl moiety, in particular differ in the substituent bonded to the five member ring of the indenyl moiety.

Still more preferably both Cp are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp must chemically differ from each other, i.e. the indenyl moieties of both Cp comprise different substituents.

Still more preferred both Cp are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents.

Yet more preferably both Cp are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents. It is in particular preferred that both Cp are idenyl rings comprising two substituents each and differ in the substituents bonded to the five membered ring of the idenyl rings.

Concerning the moiety "R" it is preferred that "R" has the formula (III)

$$—Y(R')_2— \quad (III)$$

wherein

Y is C, Si or Ge, and

R' is $C_1$ to $C_{20}$ alkyl, $C_6$-$C_{12}$ aryl, or $C_7$-$C_{12}$ arylalkyl.

In case both Cp-ligands of the asymmetric catalyst as defined above, in particular case of two indenyl moieties, are linked with a bridge member R, the bridge member R is typically placed at 1-position. The bridge member R may contain one or more bridge atoms selected from e.g. C, Si and/or Ge, preferably from C and/or Si. One preferable bridge R is —Si(R')$_2$—, wherein R' is selected independently from one or more of e.g. $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —Si(R')$_2$— is preferably e.g. —Si($C_1$-$C_6$ alkyl)$_2$-, —Si(phenyl)$_2$- or —Si($C_1$-$C_6$ alkyl)(phenyl)-, such as —Si(Me)$_2$-.

In a preferred embodiment the asymmetric catalyst is defined by the formula (IV)

$$(Cp)_2R_1ZrX_2 \quad (IV)$$

wherein each X is independently a monovalent anionic ligand, such as σ-ligand, in particular halogen both Cp coordinate to M and are selected from the group consisting of unsubstituted cyclopentadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl, with the proviso that both Cp-ligands must chemically differ from each other, and R is a bridging group linking two ligands L, wherein R is defined by the formula (III)

$$Y(R')_2— \quad (III)$$

wherein

Y is C, Si or Ge, and

R' is $C_1$ to $C_{20}$ alkyl, $C_6$-$C_{12}$ aryl, or $C_7$-$C_{12}$ arylalkyl.

More preferably the asymmetric catalyst is defined by the formula (IV), wherein both Cp are selected from the group consisting of substituted cyclopenadienyl, substituted indenyl, substituted tetrahydroindenyl, and substituted fluorenyl.

Yet more preferably the asymmetric catalyst is defined by the formula (IV), wherein both Cp are selected from the group consisting of substituted cyclopentadienyl, substituted indenyl, substituted tetrahydroindenyl, and substituted fluorenyl with the proviso that both Cp-ligands differ in the substituents, i.e. the substituents as defined above, bonded to cyclopentadienyl, indenyl, tetrahydroindenyl, or fluorenyl.

Still more preferably the asymmetric catalyst is defined by the formula (IV), wherein both Cp are indenyl and both indenyl differ in one substituent, i.e. in a substituent as defined above bonded to the five member ring of indenyl.

It is in particular preferred that the asymmetric catalyst is a non-silica supported catalyst as defined above, in particular a metallocene catalyst as defined above.

In a preferred embodiment the asymmetric catalyst is dimethylsilyl[(2-methyl-(4'-tert.butyl)-4-phenyl-indenyl)(2-isopropyl-(4'-tert.butyl)-4-phenyl-indenyl)]zirconium dichloride. More preferred said asymmetric catalyst is not silica supported.

The above described asymmetric catalyst components are prepared according to the methods described in WO 01/48034.

In a preferred embodiment the asymmetric catalyst system is obtained by the emulsion solidification technology as described in WO 03/051934. This document is herewith included in its entirety by reference. Hence in this specific embodiment the asymmetric catalyst is preferably in the form of solid catalyst particles, obtainable by a process comprising the steps of a) preparing a solution of one or more asymmetric catalyst components;

b) dispersing said solution in a solvent immiscible therewith to form an emulsion in which said one or more catalyst components are present in the droplets of the dispersed phase, c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro(methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 µm, more preferably 10 to 100 µm.

Moreover, the form of solidified particles have preferably a spherical shape, a predetermined particles size distribution and a surface area as mentioned above of preferably less than 25 $m^2$/g, still more preferably less than 20 $m^2$/g, yet more preferably less than 15 $m^2$/g, yet still more preferably less than 10 $m^2$/g and most preferably less than 5 $m^2$/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described i.a. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

The present invention is further concerned with a coated article including the polypropylene composition as described herein as a layer. The layer can be located on cellulose-based sheet for example paper, paperboard, cardboard and the like. The layer can also be located on metal sheets for example tinplate, aluminium film and the like. The term "located on" means that the layer formed by the polypropylene composition according to the present invention is in direct contact with the substrate without any intermediate layer. The main end-uses for such extrusion coated articles are in packaging applications, like liquid packaging for milk, juice, wine or other liquids, flexible packaging for meat, cheese and medical products, rigid packaging like detergent cartons, cup and plate boards for oven or microwave use or sterilizable food packaging, but also for photographic paper or industrial applications like paper reel and ream wraps.

The process for coating a coated article according to the present invention applying the polypropylene composition as described above is characterized by draw down speeds of 300 m/min, more preferably 400 m/min and most preferably 500 m/min with respect to draw down of 10 g of coating layer per square meter of substrate.

More preferably the process for coating a coated article according to the present invention applying the polypropylene composition as described above is characterized by extremely low neck-in. This extremely low neck-in is further surprisingly independent from the draw down speed. When the lag down is 20 g/m² of coating, the neck-in preferably is below 120 mm, more preferably below 110 mm at a draw down of 100 m/min. The neck-in preferably is below 110 mm and more preferably below 100 mm at a draw down of 200 m/min. At a draw down of 300 m/min, the neck-in preferably is below 110 mm and more preferably below 105 mm, whereas at a draw down of 400 m/min, the neck-in preferably is below 115 mm and more preferably below 110 mm.

The present invention is also concerned with the use of the polypropylene base resin according to the present invention for extrusion coating.

EXAMPLES

1. Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

b) Melting and Crystallisation Temperature

The melting and crystallisation temperature $T_m$ and $T_c$ are determined according to ISO 11357-3 with a TA-Instruments 2920 Dual-Cell with RSC refrigeration apparatus and data station. A heating and cooling rate of 10° C./min is applied in a heat/cool/heat cycle between +23 and +210° C., the crystallisation temperature $T_c$ being determined in the cooling step and the $T_m$ melting temperature being determined in the second heating step.

c) Comonomer Content

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N = k_1(A/R) + k_2$$

wherein A is the maximum absorbance defined of the comonomer band, R the maximum absorbance defined as peak height of the reference peak and with $k_1$ and $k_2$ the linear constants obtained by calibration. The band used for ethylene content quantification is selected depending if the ethylene content is random (730 cm$^{-1}$) or block-like (720 cm$^{-1}$). The absorbance at 4324 cm$^{-1}$ was used as a reference band.

d) Strain Hardening Factor (SHF)

The strain hardening factor is defined as $$SHF = \frac{\eta_E^+(t, \dot{\varepsilon})}{\eta_{LVE}^+(t)} = \frac{\eta_E^+(t, \dot{\varepsilon})}{3\eta^+(t)}$$

wherein
$\eta_E^+(t,\dot{\varepsilon})$ is the uniaxial extensional viscosity; and $\eta_{LVE}^+(t)$ is three times the time dependent shear viscosity $\eta^+(t)$ in the linear range of deformation.

The determination of the linear viscoelastic envelop in extension $\eta_{LVE}^+(t)$, using IRIS Rheo Hub 2008, required the calculation of the discrete relaxation time spectrum from the storage and loss modulus data (G', G" (ω)). The linear viscoelastic data (G', G" (ω)) is obtained by frequency sweep measurements undertaken at 180° C., on a Anton Paar MCR 300 coupled with 25 mm parallel plates. The underlying calculation principles used for the determination of the discrete relaxation spectrum are described in Baumgärtel M, Winter H H, "Determination of the discrete relaxation and retardation time spectra from dynamic mechanical data", Rheol Acta 28:511519 (1989) which is incorporated by reference in its entirety.

IRIS RheoHub 2008 expresses the relaxation time spectrum as a sum of N Maxwell modes $$\overset{\circ}{G}(t) = G_e \cdot \sum_1^N g_i \cdot e^{-\frac{t}{\lambda_i}}$$

wherein $g_i$ and $\lambda_i$ are material parameters and $G_e$ is the equilibrium modulus.

The choice for the maximum number of modes, N used for determination of the discrete relaxation spectrum, is done by using the option "optimum" from IRIS RheoHub 2008. The equilibrium modulus $G_e$ was set at zero.

The non-linear fitting used to obtain $\eta_{LVE}^+(t)$ is performed on IRIS Rheo Hub 2008, using the Doi-Edwards model.

The uniaxial extensional viscosity, $\eta_E^+(t,\dot{\varepsilon})$ is obtained from uniaxial extensional flow measurements, conducted on an Anton Paar MCR 501 coupled with the Sentmanat extensional fixture (SER-1). The temperature for the uniaxial extensional flow measurements was set at 180° C., applying extension rates $\partial\varepsilon/\partial t$ ranging from 0.3 s$^{-1}$ to 10 s$^{-1}$.
and covering a range of Hencky strain $$\varepsilon = (l - l_0)/l_0,$$

with $l_0$ being the original and $l$ the actual sample fixation length, from 0.3 to 3.0.

Particularly care was taken for the preparation of the samples for extensional flow. The samples were prepared by compression moulding at 230° C. followed by slow cooling to room temperature (forced water or air cooling were not used).

This procedure allowed obtaining well shaped samples free of residual stresses. The sample was left for some minutes at the testing temperature to ensure thermal stability (set temperature±0.1° C.), before carrying out the uniaxial extensional flow measurements.

e) LAOS Non-Linear Viscoelastic Ratio

The investigation of the non-linear viscoelastic behavior under shear flow was done resorting to Large Amplitude Oscillatory Shear. The method requires the application of a sinusoidal strain amplitude, $\gamma_0$, imposed at a given angular frequency, $\omega$, for a given time, t. Provided that the applied sinusoidal strain is high enough, a non-linear response is generated. The stress, $\sigma$ is in this case a function of the applied strain amplitude, time and the angular frequency. Under these conditions, the non-linear stress response is still a periodic function; however, it can no longer be expressed by a single harmonic sinusoid. The stress resulting from a non-linear viscoelastic response [1-3] can be expressed by a Fourier series, which includes the higher harmonics contributions:

$$\sigma(t,\omega,\gamma_0) = \gamma_0 \cdot \Sigma_n [G'_n(\omega,\gamma_0) \cdot \sin(n\omega t) + G''_n(\omega,\gamma_0) \cdot \cos(n\omega t)]$$

with,
    $\sigma$—stress response
    t—time
    $\omega$—frequency
    $\gamma_0$—strain amplitude
    n—harmonic number
    $G'_n$—n order elastic Fourier coefficient
    $G''_n$—n order viscous Fourier coefficient The non-linear viscoelastic response was analysed applying Large Amplitude Oscillatory Shear (LAOS). Time sweep measurements were undertaken on an RPA 2000 rheometer from Alpha Technologies coupled with a standard biconical die. During the course of the measurement the test chamber is sealed and a pressure of about 6 MPa is applied. The LAOS test is done applying a temperature of 190° C., an angular frequency of 0.628 rad/s and a strain amplitude of 10. In order to ensure that steady state conditions are reached, the non-linear response is only determined after at least 20 cycles per measurement are completed.

The Large Amplitude Oscillatory Shear Non-Linear Factor (LAOS-NLF) is defined by:

$$LAOS-NLF = \left|\frac{G'_1}{G'_3}\right|$$

where $G'_1$—first order Fourier Coefficient
    $G'_3$—third order Fourier Coefficient More details concerning the measurement are given in
1. J. M. Dealy, K. F. Wissbrun, *Melt Rheology and Its Role in Plastics Processing: Theory and* Applications; edited by Van Nostrand Reinhold, New York (1990)
2. S. Filipe, Non-Linear Rheology of Polymer Melts, AIP Conference Proceedings 1152, pp. 168-174 (2009)
3. M. Wilhelm, *Macromol. Mat. Eng.* 287, 83-105 (2002)
4. S. Filipe, K. Hofstadler, K. Klimke, A. T. Tran, Non-Linear Rheological Parameters for Characterisation of Molecular Structural Properties in Polyolefins, Proceedings of *Annual European Rheology Conference,* 135 (2010)

the documents (1) to (4) being incorporated by reference herewith.

f) Rheotens test

The test described herein follows ISO 16790:2005.

The strain hardening behaviour is determined by the method as described in the article "Rheotens-Mastercurves and Drawability of Polymer Melts", M. H. Wagner, Polymer Engineering and Sience, Vol. 36, pages 925 to 935. The content of the document is included by reference. The strain hardening behaviour of polymers is analysed by Rheotens apparatus (product of Göttfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand (2) drawn down is 120 mm/sec$^2$. The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the melt strength and drawability values.

g) Regioinversion $^{13}$C-NMR spectra were acquired on a DPX-400 spectrometer operating at 100.61 MHz in the Fourier transform mode at 120° C. The samples were dissolved in 1,1,2,2-tetrachloroethane- d2 at 120° C. with a 8% wt/v concentration. Each spectrum was acquired with a 90° pulse, 15 seconds of delay between pulses and CPD (waltzl[omicron]) to remove $^1$H—$^{13}$C coupling. About 3000 transients were stored in 32K data points using a spectral window of 6000 Hz.

2. Compositions

The intermediate product E11 was produced in a Borstar PP pilot plant in a two-step polymerization process starting in a bulk-phase loop reactor followed by polymerization in a gas phase reactor, varying the molecular weight by appropriate hydrogen feed. The catalyst used in the polymerization process was a metallocene catalyst as described in example 1 of EP 1741725 A1. The reaction conditions are listed in table 1.

TABLE 1

Reaction conditions in polymerization

| | resin | EI1 |
| --- | --- | --- |
| Pre-polymerization | Residence time [h] | 0.32 |
| | Temperature [° C.) | 30 |
| Loop reactor | Temperature [° C.] | 75 |
| | Residence Time [h] | 0.4 |
| | MFR$_2$ [g/10 min] | 0.8 |
| Gas phase reactor | Temperature [° C.] | 85 |
| | Residence Time [h] | 0.6 |
| | MFR$_2$ [g/10 min] | 2.9 |
| final MFR$_2$ [g/10 min] | | 2.9 |
| 2.1 regiodefects of mol-% | | 0.8 |

The intermediate product EI1 was subjected to a reactive extrusion in the presence of butadiene and peroxide as described in the following. Both the butadiene and the peroxide were pre-mixed with the polymer powder prior to the melt-mixing step in a horizontal mixer with paddle stirrer at a temperature of 65° C., maintaining an average residence time of 15 minutes. The pre-mixture was transferred under inert atmosphere to a co-rotating twin screw extruder of the type Theyson TSK60 having a barrel diameter of 60 mm and an L/D-ratio of 48 equipped with a high intensity mixing screw having three kneading zones and a two-step degassing setup. A melt temperature profile with initial temperature T1=220° C. in the feed zone, maximum temperature T2=240° C. in the last kneading zone and a final temperature T3=230° C. in the die zone, all temperatures being defined as barrel, was selected. The screw speed was set at 350 rpm. Following the melt-mixing step, the resulting polymer melt was pelletized in an underwater pelletizer or after solidification of one or more strands in a waterbath in a strand pelletizer at a water temperature of 40° C. Reaction conditions and rheological parameters are summarized in table 2.

The reactive extrusion was repeated modifying the conditions

TABLE 2

Reactive modification parameters and rheological characterisation of examples.

| | | EI2 | EI3 | EI4 | EI5 |
|---|---|---|---|---|---|
| Reactants and conditions | Peroxide [wt.-%]*** | 0.475 | 0.6 | 0.6 | 0.6 |
| | Butadiene [wt %] | 1.20 | 1.36 | 1.20 | 0.96 |
| | Temperature range [° C.] | 200-240 | 200-240 | 200-240 | 200-240 |
| | Screw speed [rpm] | 350 | 350 | 350 | 350 |
| | Throughput [kg/h] | 190 | 190 | 190 | 190 |
| | product | E2 | E3 | E4 | E5 |
| Final properties | MFR$_2$ [g/10 min] | 9.6 | 10 | 14.3 | 20 |
| | LAOS-NLF [—] | 4.21 | 4.24 | 4.98 | 4.31 |
| | SHF (3/2.5) [—]* | 3.36 | 4.48 | 4.43 | 3.36 |
| | SHF(1/2.0) [—]** | 2.33 | 2.07 | 1.98 | 1.88 |
| | F30 melt strength [cN] | 11.0 | 13.5 | 9.5 | 6.0 |

*strain hardening factor (SHF) measured at a strain rate of 3.0 s$^{-1}$ and a Hencky strain of 2.5.
**strain hardening factor (SHF) measured at a strain rate of 1.0 s$^{-1}$ and a Hencky strain of 2.0
***Tert-butylperoxy isopropyl carbonate (CAS No. 2372-21-6) Trigonox ® BPIC-C75 (Akzo Nobel, NL) - 75% solution in mineral spirits; the amount given in Table 2 refers to the total amount of the solution (including the mineral spirits).

The following table shows the draw down evaluation in extrusion coating versus comparative high melt strength materials. The commercial HMS-PP homopolymer WF420HMS available from Borealis Polyolefine GmbH which is produced on the base of a ZN-PP homopolymer was used as comparative example. This polymer has an MFR$_2$ of 22 g/10 min, a LAOS-NLF of 2.63, an SHF of 2.03 measured at a strain rate at 3 s$^{-1}$ and a Hencky strain of 2.5, an SHF of 1.58 measured at a strain rate at 1 s$^{-1}$ and a Hencky strain of 2.0, and an F30 melt strength of 4.0 cN determined in the Rheotens test at 200° C.

Extrusion coating runs were made on Beloit coextrusion coating line. The line had two identical extruders 1&2 with a barrel diameter of 4.5" and an L/D-ratio of 24; the output was 450 kg/h and one extruder 3 with a barrel diameter of 2.5" and an L/D-ratio of 30; output was 170 kg/h. It had a Peter Cloeren's die equipped with internal and external deckling and a five layer feed block. The width of the line was 600-800 mm and the maximum line speed was 1000 m/min (design value). In the coating line a UG kraft paper having a basis weight of 70 g/m$^2$ was coated with 20 g/m$^2$ of the inventive or comparative compositions. A second series of trials with a coating weight of 10 g/m$^2$ was also performed. The temperature of the polymer melt was set to 290° C. and the extruders' temperature profile was 200-240-290-290° C. The chill roll was matt and temperature of its surface was 15° C. The used die opening was 0.65 mm and the nip distance was 160 mm. The melt film touched the substrate for the first time+10 mm from nip to substrate side. The pressure of the pressure roll was 3.0 kp/cm$^2$. The line speed was varied between 100 and 500 m/min; the maximum draw-down speed achieved for both coating weights and the neck-in for a coating weight of 20 g/m$^2$ and various speeds are listed in table 3.

TABLE 3

Results of extrusion coating trials

| | | | Draw-down speed [m/min] | | Neck-in at 20 g/m$^2$ [mm] | | | |
|---|---|---|---|---|---|---|---|---|
| Grade | | MFR$_2$ [g/10 min] | 20 g/m$^2$ | 10 g/m$^2$ | 100 m/min | 200 m/min | 300 m/min | 400 m/min |
| WF420 HMS | CE1 | 22 | >500 | 300 | 179 | 162 | 162 | 164 |
| LCB-SSC-PP | E2 | 10 | 500 | 300 | 109 | 102 | 106 | 111 |
| | E3 | 10 | 500 | 290 | 93 | 88 | 92 | 96 |
| | E4 | 14 | >600 | 400 | 107 | 99 | 104 | 105 |
| | E5 | 20 | >600 | >500 | 117 | 105 | 107 | 110 |

The invention claimed is:

1. A polypropylene composition comprising a polypropylene base resin wherein the polypropylene base resin has a MFR (2.16 kg, 230° C., ISO 1133) of 8 to 24 g/10 min and a Large Amplitude Oscillatory Shear Non-Linearity Factor (LAOS-NLF)>2.8 wherein $$LAOS-NLF = \left|\frac{G'_1}{G'_3}\right|$$

where $G'_1$—first order Fourier Coefficient
$G'_3$—third order Fourier Coefficient.

2. A polypropylene composition according to claim 1, wherein the polypropylene base resin has a strain hardening factor (SHF) of 2.3 to 7.0 when measured at a strain rate of 3.0 $s^{-1}$ and a Hencky strain of 2.5.

3. A polypropylene composition according to claim 1 wherein the polypropylene base resin has a strain hardening factor (SHF) of 1.7 to 6.0 when measured at a strain rate of 1.0 $s^{-1}$ and a Hencky strain of 2.0.

4. A polypropylene composition according to claim 1 wherein the polypropylene base resin has a F30 melt strength of 4.6 cN or higher at 200° C.

5. A polypropylene composition according to claim 1 wherein the polypropylene base resin is a polypropylene homopolymer.

6. A polypropylene composition according to claim 1 wherein the polypropylene base resin has a regio-inversion of above 0.1 mol-%.

7. A polypropylene composition according to claim 1 wherein the polypropylene base resin has a product of [F30 melt strength x $MFR_2$ (2.16 kg, 230° C., ISO 1133)] of 130 cNg/10 min or higher.

8. A polypropylene composition according to claim 1 having a melting temperature Tm in the range of 135 to 165° C.

9. A process for the production of a polypropylene composition according to claim 1, comprising mixing an asymmetric catalyst derived polypropylene intermediate base resin having a MFR (2.16 kg, 230° C., ISO 1133) of 1.0 to 6.0 g/10 min with peroxide and a diene at a temperature of 20 to 90° C. for at least 2 minutes to form a pre-mixed material; and melt mixing the pre-mixed material in a melt mixing device at a barrel temperature in the range of 180 to 300° C.

10. A coated article including the polypropylene composition according to claim 1 as a coating layer.

11. A process for coating of an article comprising the lay down of a layer consisting of a polypropylene composition according to claim 1.

12. The process according to claim 11, wherein the draw down speed is above 300 m/min at a coating weight of 10 g of coating per square meter of substrate.

13. A method for the extrusion coating of an article comprising extrusion coating said article with a polypropylene composition according to claim 1.

* * * * *